United States Patent

Daoud

[11] Patent Number: 5,975,924
[45] Date of Patent: Nov. 2, 1999

[54] GROUNDING MECHANISM WITH INTEGRATED STRAIN RELIEF

[75] Inventor: Bassel Hage Daoud, Parsippany, N.J.

[73] Assignee: Lucent Technologies, Inc., Murray Hill, N.J.

[21] Appl. No.: 09/107,489

[22] Filed: Jun. 30, 1998

[51] Int. Cl.[6] .................................................. H01R 4/66
[52] U.S. Cl. .............................................. 439/98; 439/99
[58] Field of Search ............................... 439/98, 99, 100, 439/97; 174/78

[56] References Cited

U.S. PATENT DOCUMENTS

| | | | |
|---|---|---|---|
| 4,176,893 | 12/1979 | Olszewski et al. | 439/99 |
| 4,310,209 | 1/1982 | Fleming et al. | 439/99 |
| 4,353,612 | 10/1982 | Meyers | 439/99 |
| 4,449,768 | 5/1984 | Koncelik et al. | 439/99 |
| 4,565,417 | 1/1986 | Dussel et al. | 439/98 |
| 4,620,755 | 11/1986 | Yonkers et al. | 439/99 |
| 4,886,464 | 12/1989 | Zetena, Jr. | 439/98 |
| 4,917,615 | 4/1990 | Franks, Jr. | 439/98 |
| 5,722,841 | 3/1998 | Wright | 439/98 |

*Primary Examiner*—Michael L. Gellner
*Assistant Examiner*—Antoine Ngandjui

[57] ABSTRACT

An electrical connector assembly simply, and securely, grounds a shielding layer of a telephone cable to a conductive, grounded chassis of a protector module. The connector assembly includes an electrically conductive sleeve, which is inserted into an end of the telephone cable. The conductive sleeve engages the shielding layer within the telephone cable. A threaded stud is integrally formed on the conductive sleeve and extends outwardly. A conductive bracket is mounted on the grounded chassis, and has a through hole for receiving the threaded stud. The threaded stud is secured, by a nut, to the conductive bracket, thereby grounding the shielding layer of the telephone cable to the grounded chassis. By the arrangement, the telephone cable's shielding layer is grounded, the telephone cable is firmly coupled to the protector module, and strain relief is provided in the coupling.

20 Claims, 6 Drawing Sheets

FIG. 7
FIG. 8
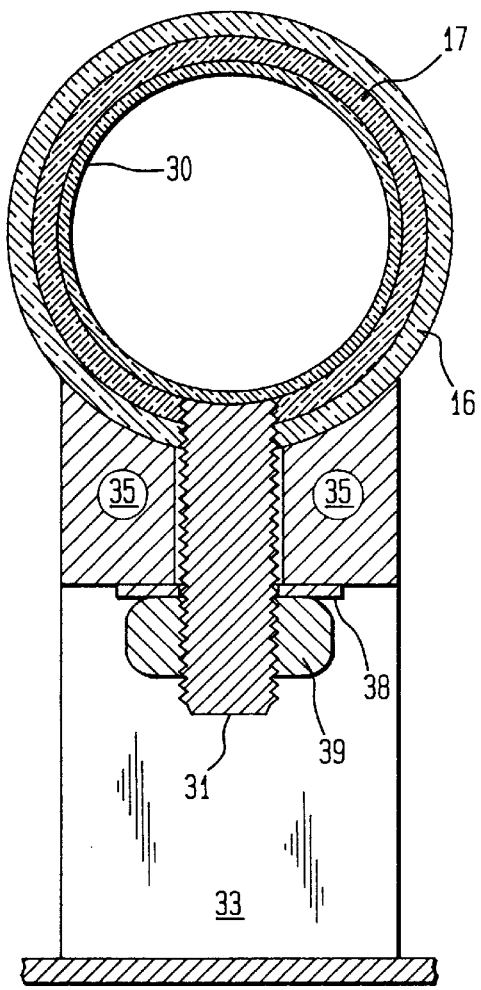
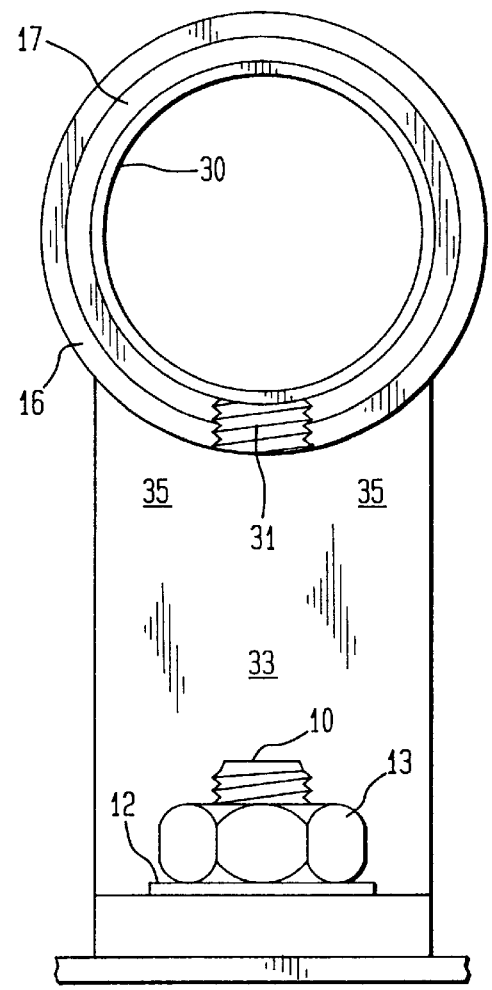

GROUNDING MECHANISM WITH INTEGRATED STRAIN RELIEF

FIELD OF THE INVENTION

This invention relates to electrical connectors. More particularly, the present invention relates to a coupling mechanism for coupling a shielding layer of a multi-phone line cable to a conductive, grounded chassis of a protector module. The coupling mechanism simultaneously, physically attaches the multi-phone line cable to the protector module, grounds the shielding layer of the multi-phone line cable to the grounded chassis of the protector module, and provides strain relief to the coupling.

BACKGROUND OF THE INVENTION

A protector module is typically provided shortly after an incoming multi-phone line cable enters into an office or apartment building, having multiple independent phone lines. The incoming multi-phone line cable includes many independent pairs of telephone wires, such as fifty pairs. The purpose of the protector module is to protect each of the independent pairs of phone lines from a power surge, such as a surge induced by a nearby lightening strike.

To accomplish this purpose, the incoming multi-phone line cable is cut, or terminated, at the protector module. Each pair of phone lines is electrically connected to one of a plurality of electrical surge protectors of the protector module. The building's internal phone lines are collectively presented to the protector module as an outgoing multi-line phone cable. The outgoing multi-line phone cable is also terminated at the protector module and has its pairs of phone lines connected to the plurality of electrical surge protectors of the protector module.

In operation, the surge protectors of the protector module respond to any power surge on one or more of the incoming phone lines by diverting the surge to the grounded chassis of the protection module. By diverting surges to ground, the surge protectors prevent the surges from passing into the phone lines of the outgoing multi-line phone cable and possibly damaging telephone equipment located within the office or apartment building.

All of the pairs of telephone wires of the incoming multi-line phone cable are surrounded by a shielding layer, which in turn is surrounded by an insulation layer. It is important to ground the shielding layer of the incoming multi-phone line cable to the grounded chassis of the protector module. Likewise, all of the pairs of telephone wires of the outgoing multi-line phone cable are surrounded by a shielding layer, which in turn is surrounded by an insulation layer, and it is important to ground this shielding layer to the grounded chassis of the protector module. By so doing, a conductive path is formed for induced currents within the shielding layers, a uniform ground is established, and electrical noise within the phone lines is reduced.

FIG. 1 is an overhead view of a protector module 1, according to the background art. An incoming multi-line phone cable 2 enters the protector module 1 through an opening provided in a sidewall 3. The incoming multi-line phone cable 2 includes numerous individual phone lines (not shown) which are wire wrapped to selected individual terminals beneath a bread board 4. Each of the individual terminals beneath the bread board 4 is electrically connected to an respective electrical socket 5 provided on an upper surface of the bread board 4.

As also illustrated in FIG. 1, an outgoing multi-line phone cable 6 enters the protector module 1 through an opening provided in an opposite sidewall 7. The outgoing multi-line phone cable 6 also includes numerous individual phone lines (not shown), which are wire wrapped to different individual terminals beneath the bread board 4.

A plurality of removable and replaceable, electrical surge protectors 8 have plug terminals, which are inserted into the sockets 5 on the upper surface of the bread board 4. The electrical surge protectors 8 electrically connect the individual phone lines of the incoming multi-line phone cable 2 to the individual phone lines of the outgoing multi-phone line cable 6. The electrical surge protectors 8 include components, such as gas filled vials, which can divert a power surge from the phone lines of the incoming multi-phone line cable 2 to ground. By this arrangement, the protector module 1 can protect phone equipment, located within the office or apartment building, attached to the individual phone lines of the outgoing multi-phone line cable 6.

FIG. 2 illustrates the physical connection between the incoming multi-phone line cable 2 and the protector module 1. The physical connection between the outgoing multi-phone line cable 6 and the protector module 1 is identical to the physical connection between the incoming multi-phone line cable 2 and the protector module 1. Therefore, the later physical connection will not be described in detail.

As shown in FIG. 2, a bracket 9 is installed to a bottom of the protector module 1 adjacent the sidewall 3. The bottom of the protector module 1 includes threaded studs 10, which are passed through holes 11 formed in the bracket 9. The bracket 9 is tightly secured to the bottom of the protector module 1 by engaging washers 12 and nuts 13 to the threaded studs 10.

An upper portion of the bracket 9 includes a plurality of ribs 14. The incoming multi-phone line cable 2 is placed upon the ribs 14, and secured to the bracket 9 by a standard hose clamp 15. The hose clamp 15 presses an insulation layer 16 of the incoming multi-phone line cable 2 tightly against the ribs 14 of the bracket 9. By this arrangement, the hose clamp 15 provides strain relief to the connection by preventing any tension on the wire wrap connections between the individual phone lines and the wire wrap terminals of the bread board 4.

Inside the insulation layer 16 is a shielding layer 17. The shielding layer 17 prevents electro-magnetic fields adjacent to the incoming multi-phone line cable 2 from inducing currents with the individual phone lines, and thereby prevents undesirable electrical noise. It is important that the shielding layer 17 be electrically connected to a ground potential. In order to accomplish this grounding, a clamping device 18 is provided.

The clamping device 18 includes an electrically conductive, stationary jaw 19. The stationary jaw 19 has a threaded stud 20 integrally formed therewith. A short slit is cut through the insulation layer 16 and the shielding layer 17, wide enough to accommodate the threaded stud 20. Then, the stationary jaw 19 is inserted into an end of the incoming multi-phone line cable 2 so that the stationary jaw contacts the shielding layer 17, while the threaded stud 20 passes along in the slit formed in the insulation layer 16 and the shielding layer 17.

A clamping jaw 21 has a through hole 22 formed therein. The threaded stud 20 is passed through the through hole 22, and then the clamping jaw is placed adjacent to the insulation layer 16. A washer 27 and nut 23 are installed on the threaded stud 20 and the nut 23 is tightened. By this arrangement, the stationary jaw 19 can be securely, electrically connected to the shielding layer 17.

A ground strap 24 connects the stationary clamp 19 to a first grounding post 25 provided on a conductive, grounded chassis of the protector module 1, adjacent the bread board 4. The outgoing multi-phone line cable 6 has its shielding sleeve connected to a second grounding post 26 provided on the grounded chassis of the protector module 1, in a manner identical to that described above in conjunction with the incoming multi-phone line cable 2. Because the grounded chassis is conductive, the first grounding post 25 is electrically connected to the second grounding post 26, and thereby the shielding sleeves of the incoming and outgoing multi-phone line cables are electrically connected.

The above described method of grounding the shielding layers of the incoming and outgoing multi-line phone cables suffers several drawbacks. The pressure exerted by the hose clamp 15, against the insulation layer 16, translates into internal stresses on the phone lines within the incoming multi-line phone cable 2. The stresses can break a conductor within a particular phone line, resulting in a loss of phone service. The stresses can deform the conductor within a particular phone line, creating a resistance in the conductor, resulting in noise in the phone service. Also, the stresses can press the phone lines closer together, resulting in cross-talk between phone lines. Further disadvantages are that a service technician must remember, and spend time installing, the clamping device 18. The clamping device 18 takes up space within the protector module 1, and the ground strap 24 presents an obstacle within the protector module 1.

SUMMARY OF THE INVENTION

The electrical coupling mechanism of the present invention overcomes one or more of the disadvantages associated with the clamping device 18 of the background art. The electrical coupling mechanism of the present invention simultaneously, physically attaches the multi-phone line cable to the protector module, grounds the shielding layer of the multi-phone line cable to the conductive chassis of the protector module, and provides strain relief to the coupling.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitative of the present invention, and wherein:

FIG. 7 is a cross sectional view taken along line 7—7 of FIG. 6; and

FIG. 8 is a cross sectional view taken along line 8—8 of FIG. 6.

DETAILED DESCRIPTION

Figure 1:
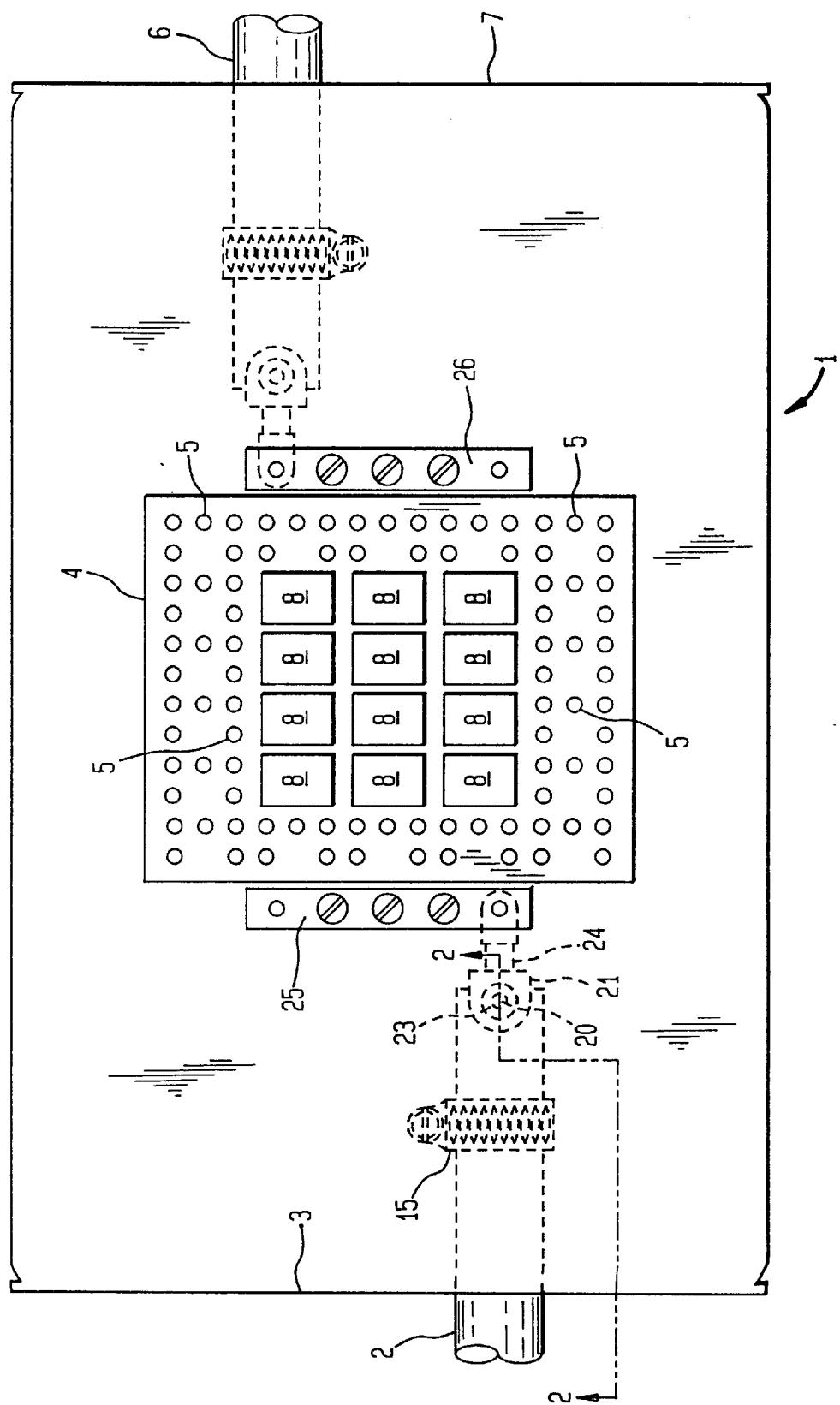
FIG. 1 is an overhead view of a protector module having an electrical connection between a shielding layer of a multi-line phone cable and a conductive terminal on the chassis of the protector module, in accordance with the background art.
Figure 2:
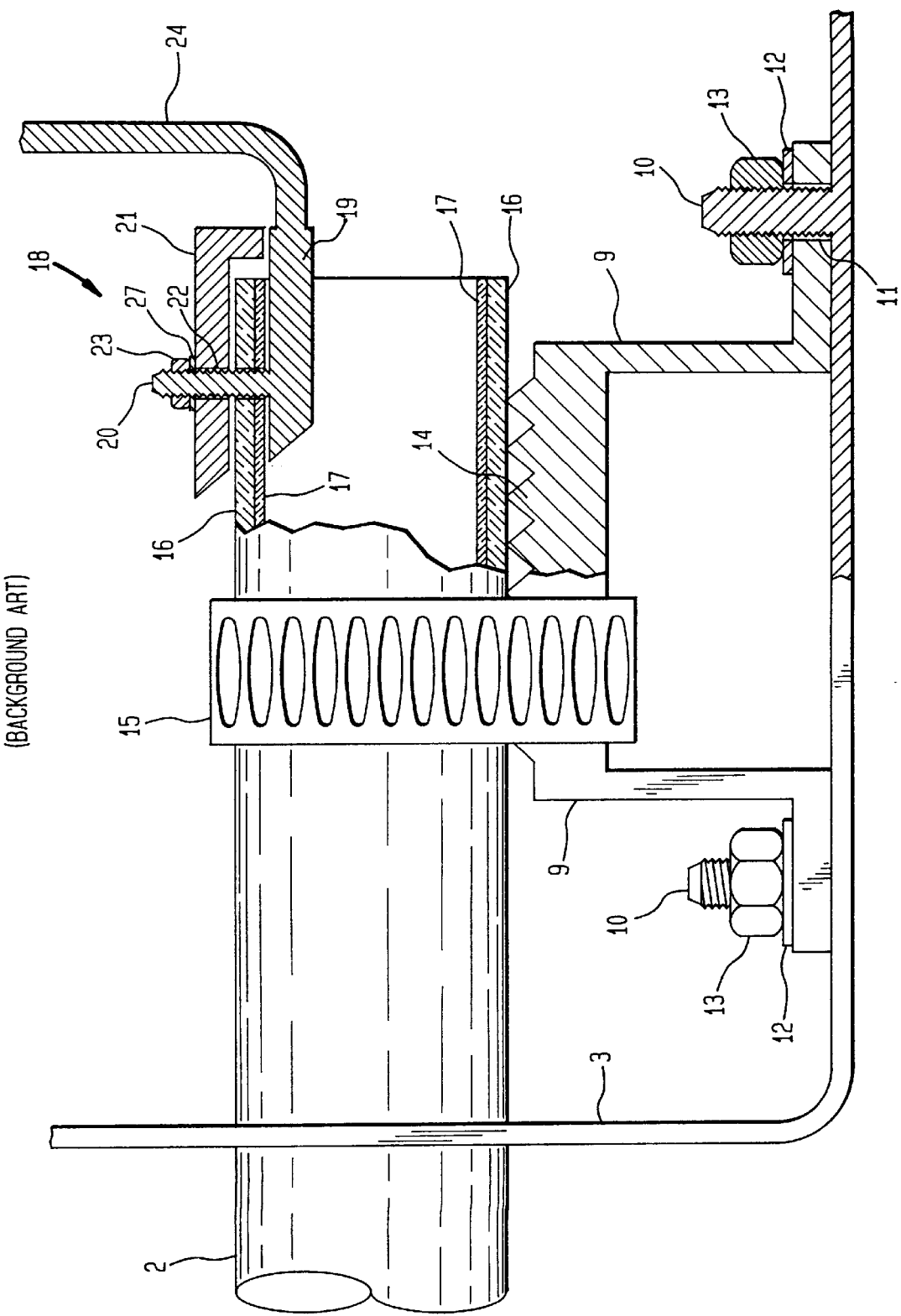
FIG. 2 is a cross sectional view taken along line 2—2 of FIG. 1.
Figure 3:
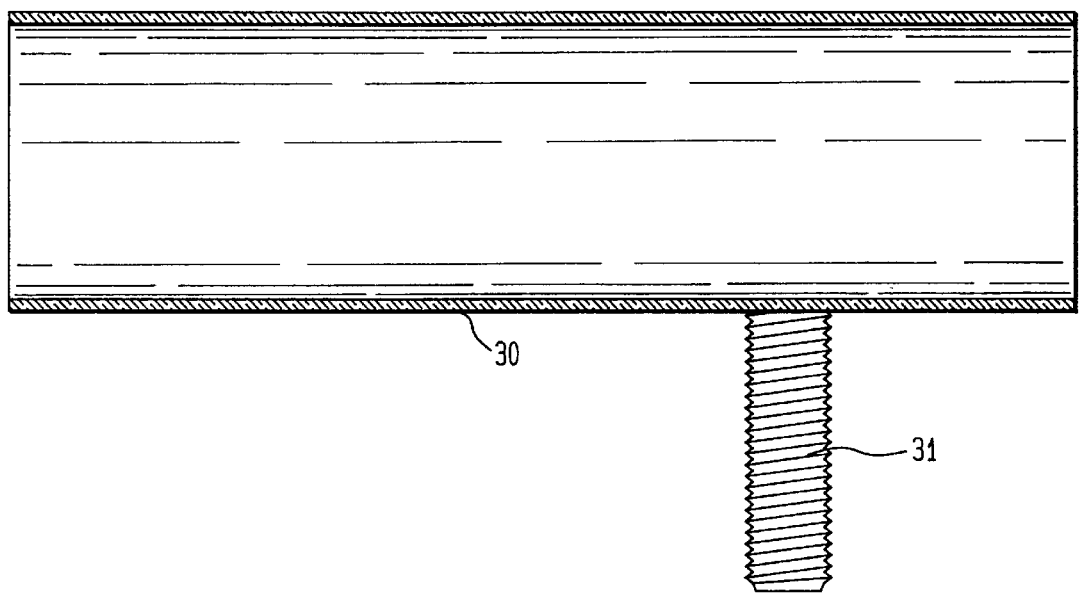
FIG. 3 is a cross sectional view of a conductive sleeve with an integral threaded stud, in accordance with the present invention.

FIG. 3 is a cross sectional view of a conductive sleeve 30 for use in the electric coupling mechanism of the present invention. The conductive sleeve 30 is shaped as a cylinder having two open ends. A conductive projection, in the form of threaded stud 31, extends from a sidewall of the conductive sleeve 30. Although the conductive sleeve 30 is illustrated in the Figures as having a circular cross section, it would be possible for the conductive sleeve 30 to have other cross sectional shapes, such as square, rectangular, or octagonal.

Figure 4:
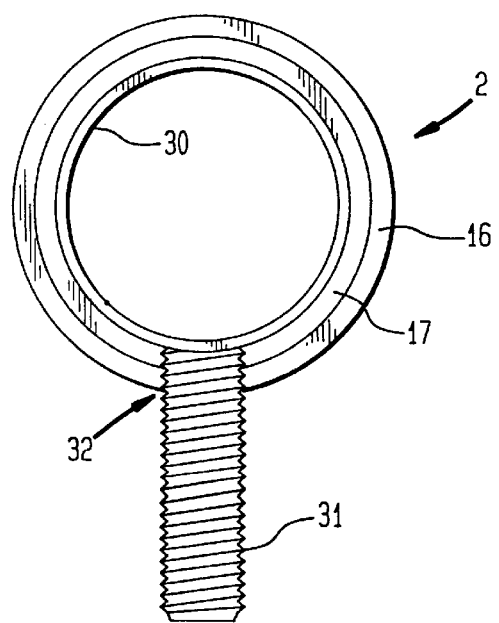
FIG. 4 is an end view of the conductive sleeve inserted into an end of a multi-line phone cable, with the conductive sleeve in electrical contact with a shielding layer of the multi-line phone cable.

FIG. 4 illustrates the cut, or terminated, end of the incoming multi-line phone cable 2. A short slit 32, extending to the cut end, is formed in the lower portions of the shielding layer 17 and the insulation layer 16. The conductive sleeve 30 is inserted into the cut end of the incoming multi-line phone cable 2, in such a manner that the threaded stud 31 registers within the slit 32. Although not illustrated, it is to be understood that a plurality of phone lines, such as fifty to one hundred phone lines, would pass through the cross section of the conductive sleeve 30 and extend up to the wire wrap terminals under the bread board 4.

The conductive sleeve 30 has a conductive outer surface. When the conductive sleeve 30 is fully inserted into the cut end of the incoming multi-line phone cable 2, the conductive outer surface will make electrical contact with the inner surface of the shielding layer 17. Further, the conductive sleeve 30 will provide rigidity to an ending length of the incoming multi-line phone cable 2, corresponding to a length of the conductive sleeve 30, such as one or two inches.

Figure 5:
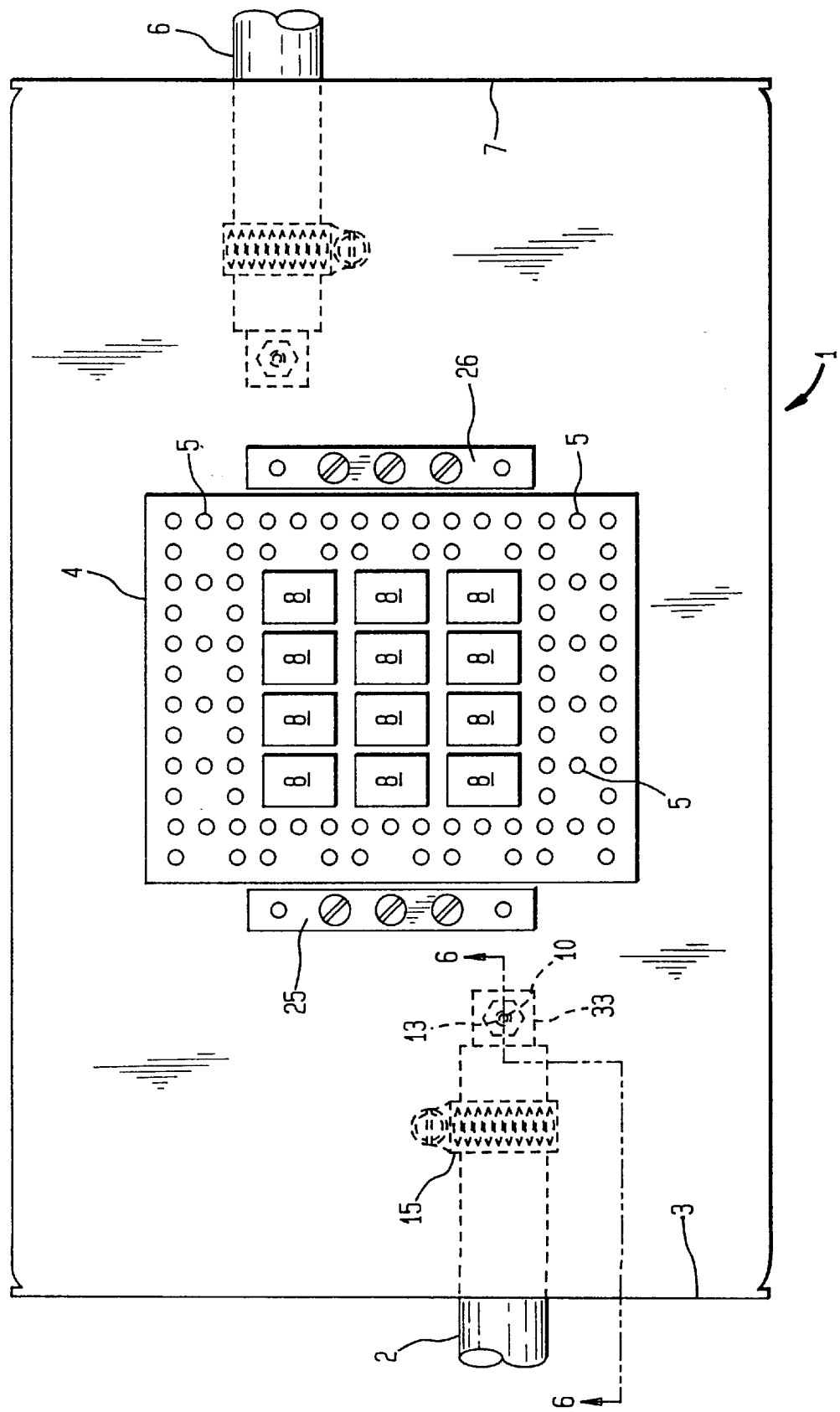
FIG. 5 is an overhead view of a protector module having an electrical connection between the shielding layer of the multi-line phone cable and a conductive chassis of the protector module, in accordance with the present invention.
Figure 6:
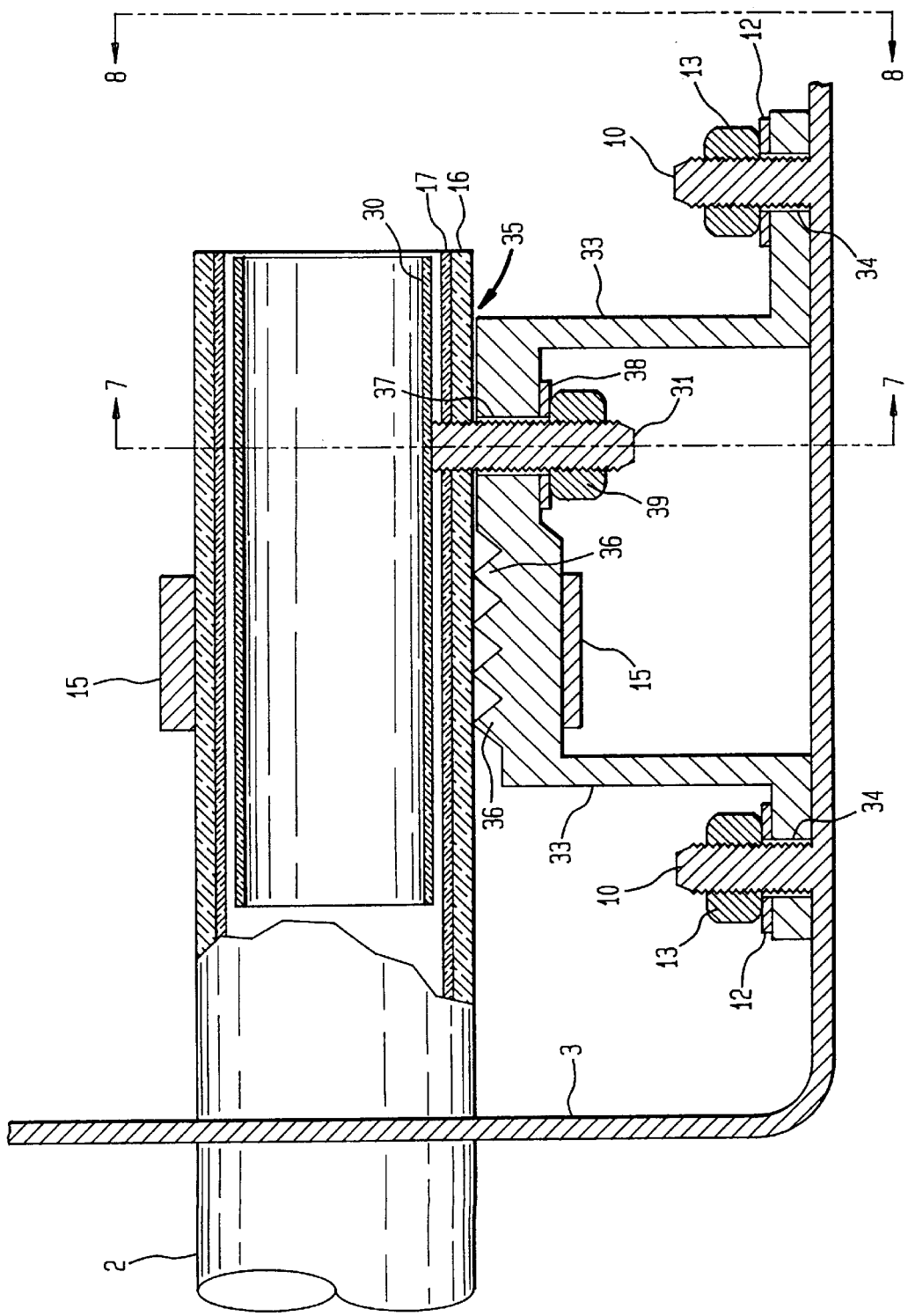
FIG. 6 is a cross sectional view taken along line 6—6 of FIG. 5.

FIGS. 5 and 6 illustrate the incoming multi-line phone cable 2 connected to the protector module 1. As best seen in FIG. 6, a conductive terminal, in the form of a conductive bracket 33, is installed on the bottom of the protector module 1, adjacent the sidewall 3. The bottom of the protector module 1 includes the threaded studs 10, which are passed through holes 34 formed in the conductive bracket 33. The conductive bracket 33 is tightly, and electrically conductively, secured to the bottom of the protector module 1 by engaging washers 12 and nuts 13 to the threaded studs 10.

An upper portion 35 of the conductive bracket 33 includes ribs 36 and a through hole 37. The cross section of the upper portion, as best seen in FIGS. 7 and 8, matches the cross section of the conductive sleeve 30 and incoming multi-line phone cable 2. In other words, the illustrated cross section is circular. However, it should be noted that if the conductive sleeve 30 were octagonal, or any other shape, that the cross section of the upper portion 35 would be octagon, or matching to the other chosen shape.

To secure the incoming multi-line phone cable 2 to the protector module 1, the threaded stud 31 is inserted into the through hole 37 formed in the upper portion 35 of the conductive bracket 33. A washer 38 and a nut 39 are engaged onto the threaded stud 31 and tightened. Tightening the nut 39 brings the end portion of the incoming multi-line phone cable 2 into mating engagement with the upper portion 35 of the conductive bracket 33.

The threaded stud 31, washer 38, and nut 39 are constructed of electrically conductive material. Therefore, when the nut 38 is tight, good electrical contact is made between the shielding layer 17 and the conductive bracket 33. The outgoing multi-line phone cable 6 is connected to a separate conductive bracket adjacent the sidewall 7 of the protector module 1, in a manner identical to the connection between the incoming multi-line phone cable 2 and the protector module 1. Because the chassis of the protector module 1 is formed of an electrically conductive material, such as sheet steel, the shielding layers of the incoming and outgoing multi-line phone cables are in electrical contact.

FIGS. 5 and 6 illustrate the presence of the standard hose clamp 15. The hose clamp 15 encircles the incoming multi-line phone cable 2, and provides additional security to the physical connection between the conductive bracket 33 and the incoming multi-line phone cable 2. It would be possible, according to the present invention, to delete the hose clamp, since the rigidity of the conductive sleeve 30 should provide sufficient security to the physical connection.

It can be seen from the present invention, that the ground strap 24 and two piece clamp assembly 18 are no longer required. Further, it can be seen that the rigidity of the conductive sleeve 30 will protect the phone lines, within the incoming multi-line phone cable 2, should a hose clamp 15 be employed to secure the connection. Also, it is possible to eliminate the hose clamp 15 if desired.

Although the present invention has been illustrated in conjunction with grounding a shielding layer of a multi-line phone cable to a chassis of a protector module, it should be readily apparent that the invention would be suitable for different types of shielded electrical cables. For example, the connection device would be suitable for connecting a chassis to a shielding layer of a power line, speaker wires, 75 ohm video cable, computer cable, etc. Further, although a threaded stud 31 and nut 39 are illustrated as the securing assembly, it should be appreciated that other securing assemblies would be possible. For example, the threaded stud 31 could be replaced by an elongated, ribbed fastener, and the through hole 37 could include a resilient, spring steel member, sized to prevent removal of the ribbed faster by engaging the ribs thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A connection device for grounding a shielded electrical cable to a chassis comprising:
   a conductive sleeve having a conductive outer surface, said conductive sleeve for insertion into the shielded electrical cable and said conductive outer surface for engaging against a conductive shielding layer of the shielded electrical cable;
   a conductive projection attached to, and extending outwardly from, said conductive outer surface of said conductive sleeve;
   a conductive terminal for attachment to the chassis; and
   a fastening device for connecting said conductive projection to said conductive terminal portion to establish electrical conductivity between said conductive sleeve and said conductive terminal.

2. The connection device according to claim 1, wherein said fastening device is a separate element from said conductive projection and said conductive terminal.

3. The connection device according to claim 1, wherein said conductive sleeve is in the shape of a cylinder.

4. The connection device according to claim 1, wherein said conductive terminal includes a through hole for receiving said conductive projection.

5. The connection device according to claim 4, wherein said conductive projection is a threaded stud and said fastening device is a nut for engaging said threaded stud.

6. The connection device according to claim 1, further comprising:
   a clamping portion formed on said conductive terminal; and
   a clamp for encircling the shielded electrical cable and said clamping portion to physically attach the electrical cable to said conductive terminal.

7. The connection device according to claim 6, wherein said clamping portion is in the form of an arc shaped concave portion having a radius of curvature to mate with a radius of curvature of the shielded electrical cable.

8. A telephone apparatus comprising:
   a telephone cable having an outer insulation layer and an inner conductive shielding layer;
   a conductive sleeve having a conductive outer surface, said conductive sleeve being inside an end of said shielded telephone cable, and said conductive outer surface engaging against an inner surface of said inner conductive shielding layer of said telephone cable; and
   a conductive projection attached to, and extending outwardly from, said conductive outer surface of said conductive sleeve, said conductive projection passing through said inner conductive shielding layer and said outer insulation layer.

9. The telephone apparatus according to claim 8, wherein said telephone cable includes a plurality of phone line pairs, and the inner conductive shielding layer surrounds said plurality of phone line pairs.

10. The telephone apparatus according to claim 8, further comprising:
    a chassis; and
    a conductive terminal attached to said chassis, wherein said conductive projection is attached to said conductive terminal establishing electrical conductivity between said inner conductive shielding later of said telephone cable and said conductive terminal.

11. The telephone apparatus according to claim 10, further comprising a fastening device attaching said conductive projection to said conductive terminal, wherein said conductive terminal includes a through hole for receiving said conductive projection.

12. The telephone apparatus according to claim 11, wherein said conductive projection is a threaded stud and said fastening device is a nut for engaging said threaded stud.

13. The telephone apparatus according to claim 10, further comprising:
    a clamping portion formed on said conductive terminal; and
    a clamp encircling said outer insulation layer of said telephone cable and said clamping portion, to physically attach said telephone cable to said conductive terminal.

14. The telephone apparatus according to claim 13, wherein said clamping portion is in the form of an arc shaped concave portion having a radius of curvature to mate with a radius of curvature of said outer insulation layer of said telephone cable.

15. The telephone apparatus according to claim 10, wherein said chassis includes a protector module for grounding power surges within said telephone cable.

16. The telephone apparatus according to claim 15, wherein said conductive terminal is electrically connected to an earth ground.

17. A method of connecting an electrical cable to an electrical box comprising the steps of:

providing an electrical box having a conductive terminal attached thereto;

providing an electrical cable having an outer insulation layer and an inner conductive shielding layer;

providing a conductive sleeve with a conductive outer surface; providing a conductive projection attached to, and extending away from, the conductive outer surface of the conductive sleeve;

cutting a slit in the outer insulation layer and the inner conductive shielding layer of the electrical cable, the slit extending to an end of the electrical cable;

aligning the conductive projection with the slit;

inserting the conductive sleeve into the open end of the electrical cable so that the conductive sleeve abuts against an inner surface of the inner conductive shielding layer, and the conductive projection passes along in the slit; and fastening the conductive projection to the conductive terminal, thereby establishing electrical communication between the inner conductive shielding layer of the electrical cable and the conductive terminal of the electrical box.

18. The method according to claim 17, further comprising:

providing a clamping portion on the electrical box;

providing a clamp;

aligning the clamp adjacent a portion of the insulation layer beneath which the conductive sleeve resides and adjacent the clamping portion of the electrical box; and clamping the clamp to physically connect the electrical cable to the clamping portion of the electrical box, and to simultaneously provide strain relief to the electrical cable and electrical box connection.

19. The method according to claim 17, wherein said step of fastening includes the steps of:

providing a through hole in the conductive terminal;

providing a fastener;

inserting the conductive projection through the through hole in the conductive terminal; and attaching the fastener to the conductive projection.

20. The method according to claim 19, wherein the conductive projection is a threaded stud and the fastener is a nut, and said step of attaching includes threading the nut onto the threaded stud and tightening the nut.

* * * * *